United States Patent [19]

Dollinger et al.

[11] 4,165,364

[45] Aug. 21, 1979

[54] CARBON BLACK REACTOR WITH AXIAL FLOW BURNER

[75] Inventors: Robert E. Dollinger, Bedford; Clinton M. Wright, Odessa, both of Tex.; Theodore A. Ruble, deceased, late of Fort Worth, Tex., by Eulalia Berry Ruble, executrix

[73] Assignee: Sid Richardson Carbon & Gasoline Co., Fort Worth, Tex.

[21] Appl. No.: 847,159

[22] Filed: Oct. 31, 1977

Related U.S. Application Data

[62] Division of Ser. No. 711,443, Aug. 4, 1976, Pat. No. 4,077,761.

[51] Int. Cl.$^2$ .................................. C01B 31/02
[52] U.S. Cl. .................................. 423/456; 431/8; 422/151
[58] Field of Search .................... 431/8, 9, 353, 354, 431/186; 23/259.5; 432/222; 423/450, 455, 456

[56] References Cited

U.S. PATENT DOCUMENTS

| | | | |
|---|---|---|---|
| 2,976,127 | 3/1961 | Latham | 423/450 X |
| 3,753,658 | 8/1973 | Henderson et al. | 423/450 X |
| 3,986,836 | 10/1976 | Cheng | 423/450 X |
| 4,085,197 | 4/1978 | Cheng | 423/450 |

*Primary Examiner*—Edward G. Favors
*Attorney, Agent, or Firm*—Vinson & Elkins

[57] ABSTRACT

An improved burner for combusting gaseous fuel and oxidant gas is provided in which the fuel and oxidant gas are premixed prior to combustion by the turbulence generated by flowing the gases through a mixing zone containing a centrally disposed flow disrupting bluff body positioned in the oxidant gas stream upstream from the point of fuel injection, and a peripheral flow disrupting bluff body disposed at the periphery of the mixing zone. The burner finds particular utility in combination with other elements of a furnace-type carbon black reactor. This abstract is not to be construed in any way to define or limit the invention set forth below.

1 Claim, 9 Drawing Figures

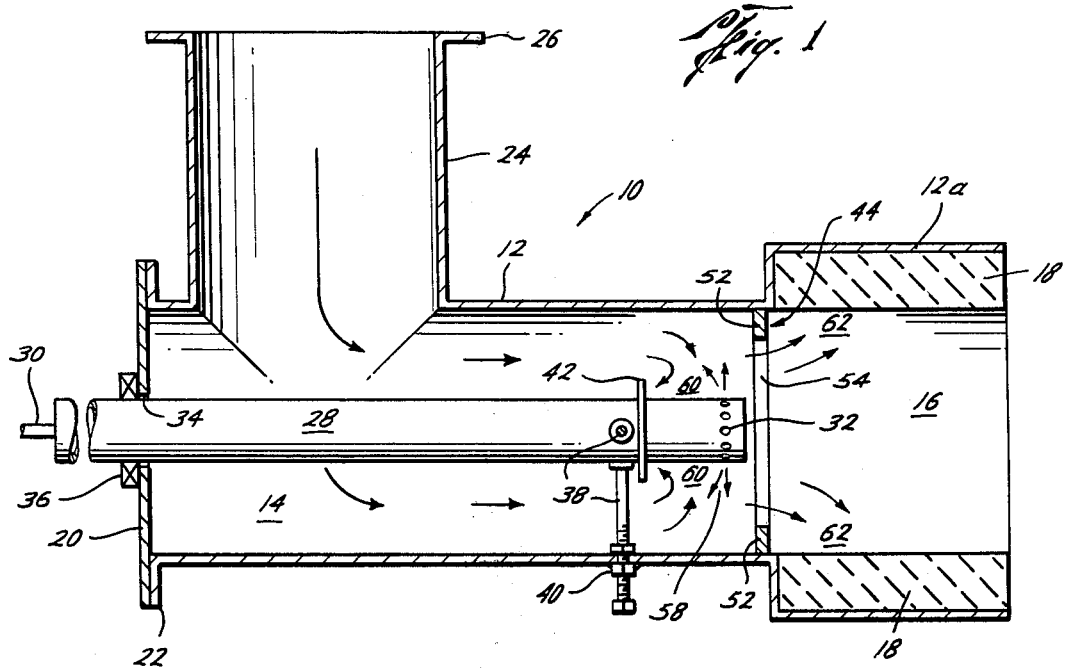
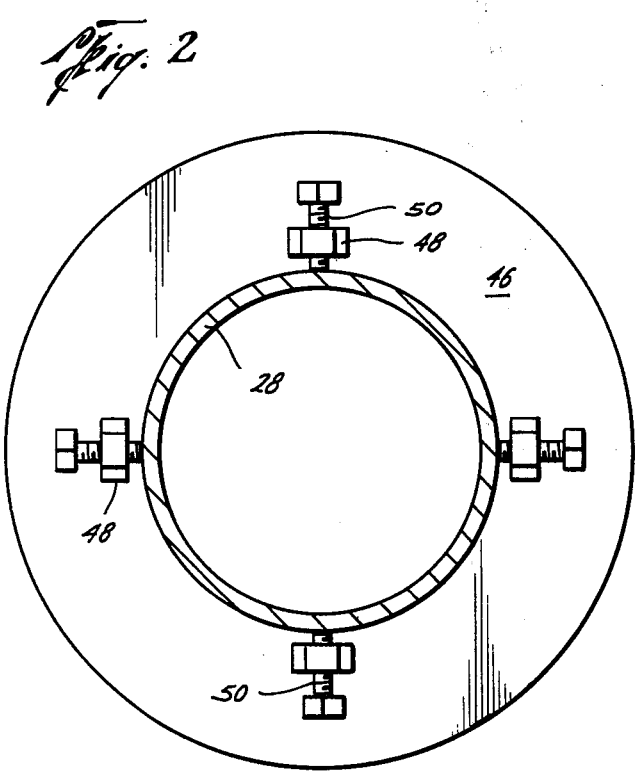
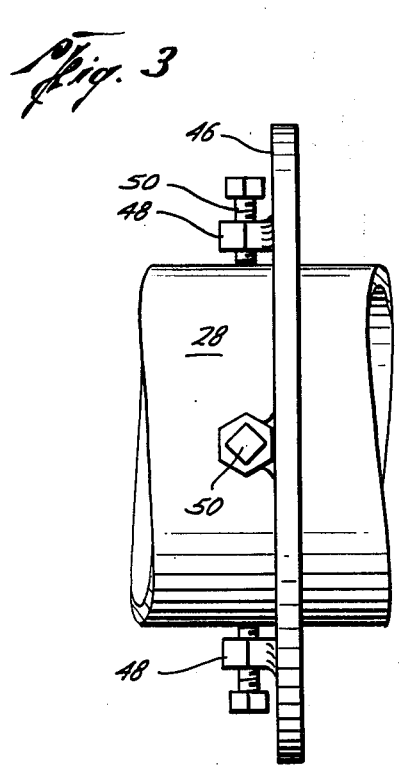

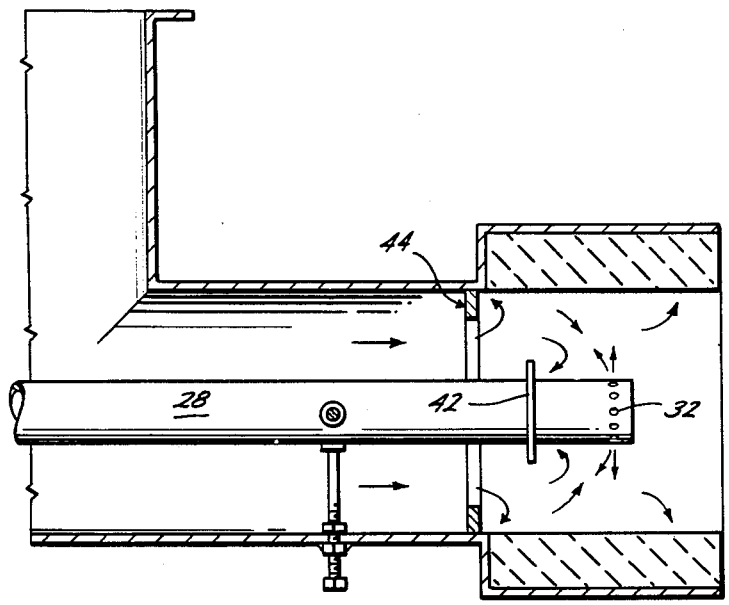
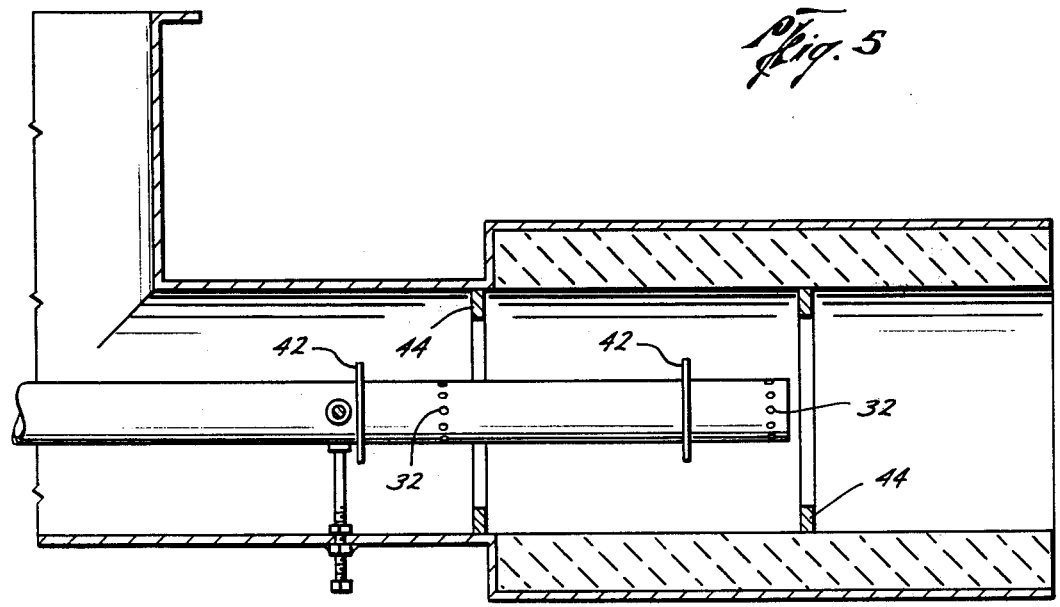

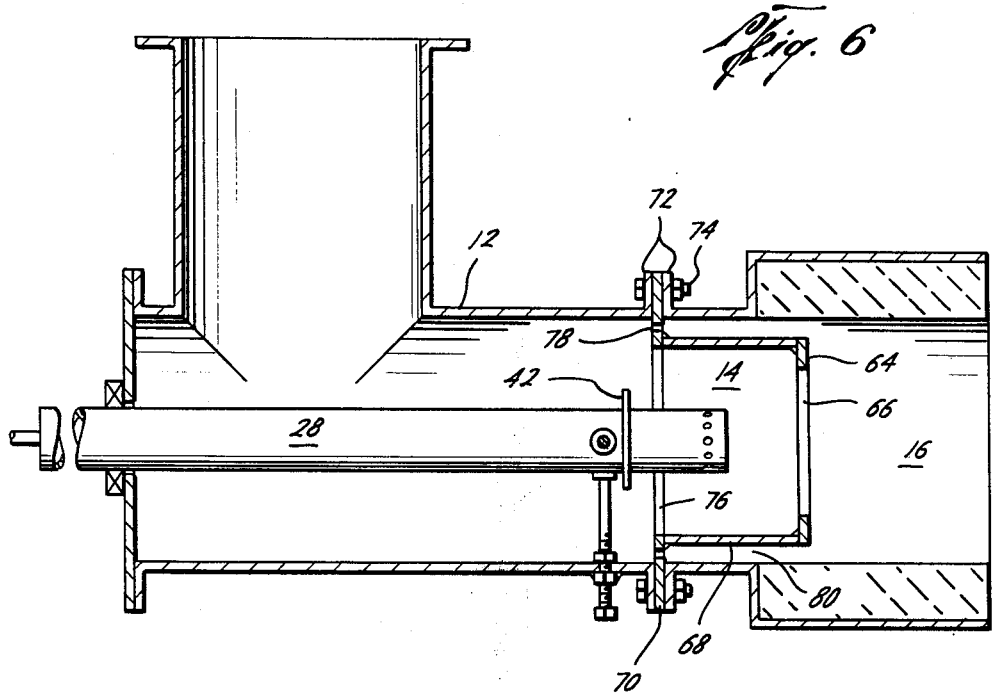
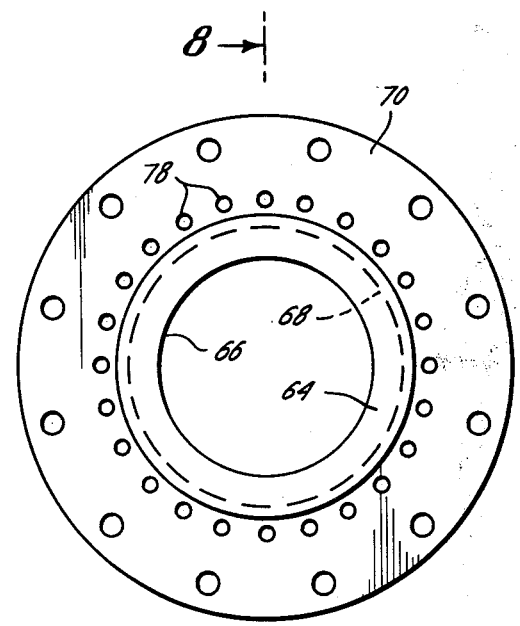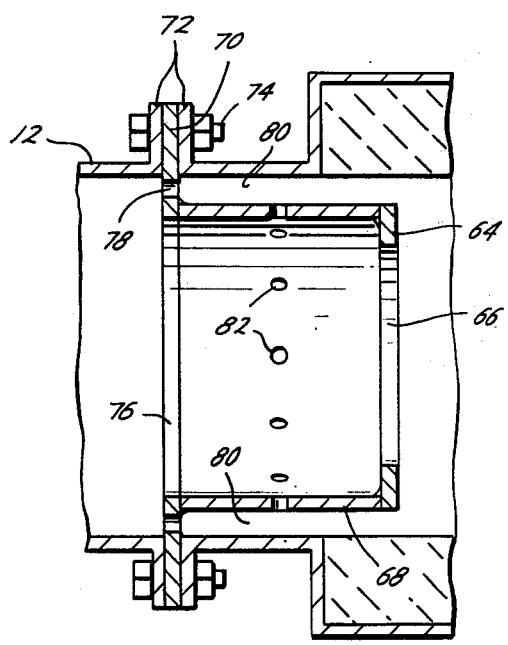

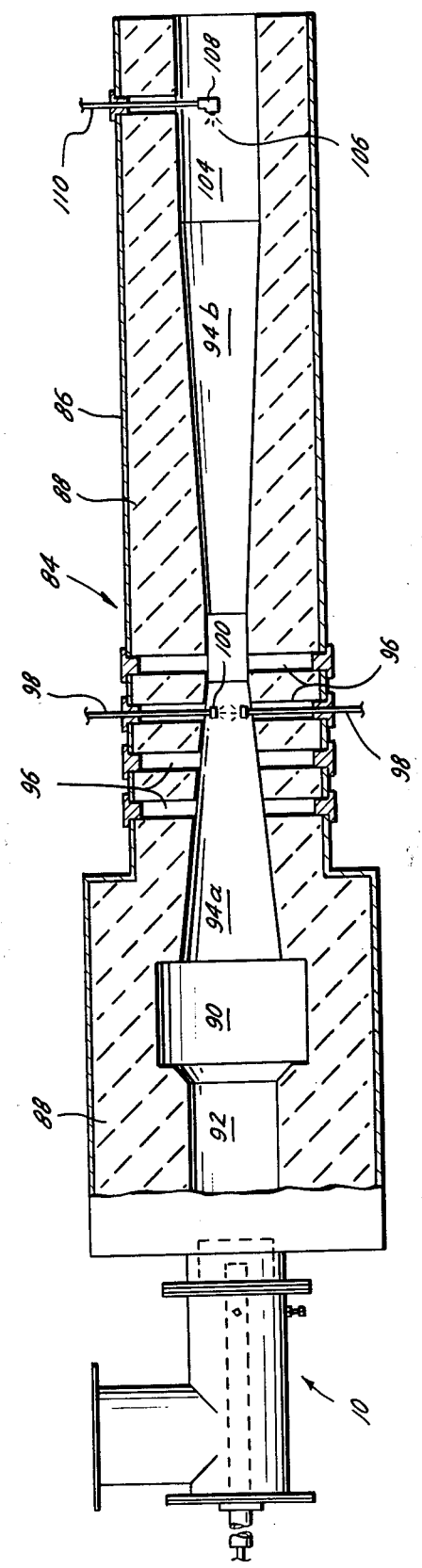

CARBON BLACK REACTOR WITH AXIAL FLOW BURNER

BACKGROUND OF THE INVENTION

This application is a division of co-pending application Ser. No. 711,443 filed Aug. 4, 1976 now U.S. Pat. No. 4,077,761.

This invention relates to an improved method and apparatus for gaseous fuel combustion, useful in many applications. This invention also relates to the production of furnace-type carbon black, utilizing a hot stream of gases produced by the burner apparatus of the invention, and injecting into the hot gases a suitable feedstock hydrocarbon under proper flow conditions. More particularly, the invention relates to an improved method and apparatus for producing carbon black whereby heat is generated in an especially advantageous manner and in which the conditions of flow of the hot gases and the manner of introduction of the hydrocarbon feedstock are such as to allow a highly desirable versatility in the production of a wide range of particle size and structure of furnace carbon blacks demanded by the market.

Carbon blacks are produced by several processes, the most common being the channel process, the thermal process and the furnace process. The historic channel process produces carbon black by the impingement of flames of gaseous fuel in channel irons in an environment of air deficiency. Because of the price and supply of natural gas, the process is much less used than formerly. The thermal process is a cyclic process which contacts hydrocarbon gases cyclically with hot checkerwork, and produces a coarse carbon black of low structure. The thermal blacks are used largely as fillers where a minimum of reinforcement of rubber is required. The furnace process is more economical than these two. In the furnace process, a hydrocarbon fuel is burned in a closed vessel, usually refractory-lined, to produce hot combustion product gases and another hydrocarbon stream is injected into the hot gases of combustion to be carbonized and form the product. The second hydrocarbon stream from which the carbon black is made is commonly referred to as the "make" or "feedstock" stream.

In the furnace processes, the feedstock may be a gas, but for both economic and quality reasons, an aromatic hydrocarbon oil is the material of choice. The fuel may be a gas or an oil, but where gas is available and is economical, it is the fuel of choice.

Oil furnace carbon black reactors are generally of circular cross section and elongate configuration, and are functionally composed of several zones. The first zone is the zone of combustion in which fuel and air are burned to produce hot combustion product gases which supply heat for the process. This heat-supplying combustion process is of critical importance, because the temperature of the combustion products determines to a great degree the quality of the carbon black produced. In addition, a combustion system which results in uneven burning may cause marked and harmful temperature gradients within a reactor, thus subjecting one portion of the feedstock to a different temperature than another portion of the feedstock. Unburnt fragments of a non-aromatic fuel may also interfere with the kinetics of carbonization of the aromatic oil. It is also important that the hot gases leaving the zone of combustion flow in such a manner that the aerodynamic pattern is favorable to the formation of the quality of carbon black desired.

The most efficient burners heretofore known for carbon black reactors utilized vortex or tangential flow of the gases in order to achieve sufficient mixing of the air and fuel gas for complete, uniform combustion. However, a characteristic of such a burner is that the hot combustion products continue to have a vortex, or tangential flow, pattern as they exit from the burner and enter the carbon black reactor proper. This is less desirable for the production of certain types of carbon black than is axial or linear flow of the reaction products. On the other hand, linear flow of the combustion product gases, where desired, has heretofore been achieved only through burners which are less efficient and advantageous than either vortex burners or the burners of the present invention. Therefore, combination of the burner of the present invention, with the other elements of a carbon black reactor, as hereinafter described, provides for highly efficient combustion of the fuel gas and air while at the same time producing linear or axial flow of the combustion products as they are fed to the reaction zone of the carbon black reactor.

The second zone is the reactor is the zone of reaction, in which the oil is dehydrogenated, nucleated as carbon, accreted into chains or clusters to form what is known as structure, and formed into the ultimate particle size it will attain. In the electron microscope, carbon black typically appears as more or less spheroidally-shaped particles fused together in clusters or chains. The degree of such clustering or chaining is the degree of structure of the material. When compounded into rubber formulations, blacks with higher structure produce stiffer compounds, and may be compounded with higher proportions of extender oil, which is an economic advantage. In some degree, higher structure contributes to the resistance to abrasion of rubber used in treads of automobile tires. However, for some uses in rubber, lower levels of structure are required. Therefore, it is necessary that the manufacturer of carbon black be able to make a range of structure levels to meet the market demands.

The third zone of the carbon black process is the quench zone in which the reaction is rapidly cooled by water injection. After the formation of the carbon, prolonged exposure to high heat damages the properties of the rubber formulations made with the product. The choice of the position of the water stream which quenches the reaction may be properly made by those skilled in the art of carbon black manufacture. If quenched too soon, the process will produce an oily carbon; if quenched too late, the process will produce a black with a damaged surface.

OBJECTS OF THE INVENTION

One object of the invention is to provide a novel burner apparatus which produces a flame of high temperature and high heat release per unit of volume. Another object is to provide a burner producing a stable flame front without flame contact with a flame holder. Another object of the invention is to provide apparatus for producing a stable, intense flame without introducing fuel or oxidant gas tangentially to form a vortex and for obtaining the quality of combustion attainable by tangential or vortex flow, without utilizing tangential flow or the ponderous equipment which its use requires.

An important object of the invention is to provide a combination of a uniquely efficient non-tangential burner of great flexibility with a tapered carbon black reactor, including means for radial injection of carbon black feedstock into the axially flowing combustion products in the reactor.

DESCRIPTION OF THE DRAWINGS

These and other objects and advantages of the invention will become apparent from the specification drawings and claims. In the accompanying drawings, in which like numerals indicate like parts:

FIG. 1 is a view in vertical section illustrating, somewhat diagrammatically, a preferred embodiment of the burner according to the present invention;

FIG. 2 is a view in front elevation of the central bluff body of the burner of FIG. 1;

FIG. 3 is a view in side elevation of the central bluff body of FIG. 2;

FIG. 4 is a view in vertical section illustrating diagrammatically the function of the burner of FIG. 1 when the central bluff body is located upstream of the annular bluff body;

FIG. 5 is a view in vertical section illustrating diagrammatically an alternate embodiment of the burner, having a plurality of central and annular bluff bodies;

FIG. 6 is a view in vertical section illustrating the preferred commercial embodiment of the burner;

FIG. 7 is a view in front elevation of the peripheral bluff body of FIG. 6;

FIG. 8 is a view in vertical section of the peripheral bluff body of FIG. 7, taken along lines 8—8 of FIG. 7; and FIG. 9 is a view in side elevation of a furnace-type carbon black reactor in combination with the burner of FIG. 6.

DESCRIPTION OF THE INVENTION

Referring to FIG. 1 there is shown in vertical section a burner 10 constructed in accordance with the present invention. It includes a cylindrical housing 12, preferably of metal, defining a generally cylindrical mixing zone 14, in which the oxidant gas and fuel are premixed, and a combustion zone 16 in which the gases are burned to release heat. The housing 12 is of enlarged diameter as shown in 12a in the combustion zone area and is lined with refractory material 18 to tolerate high temperatures produced by the burner. A plate 20 attached to housing 12 by flange 22 closes the upstream end of the mixing zone 14.

Means for introducing oxidant gas, preferably air, into the mixing zone 14 comprise a duct 24 opening through the housing 12 and having a flange 26 for attachment to a supply of oxidant gas, preferably air. Air supplied through duct 24 will flow axially through the mixing zone 14, where it is admixed with gaseous fuel as described hereinbelow, and thence into the combustion zone 16 for combustion.

Means for introducing gaseous fuel into the air flowing axially in the mixing zone 14 preferably comprise a fuel supply tube 28 connected to fuel supply 30 and having a plurality of orifices 32 for injecting fuel gas into the flowing oxidant gas at a point downstream from the air supply duct 24. The fuel supply tube 28 is centered about the longitudinal axis of the mixing zone 14 in housing 12 and extends through a central opening 34 in the end plate 20. Tube 28 is manually adjustable along the longitudinal axis of the mixing zone 14, a suitable packing gland 36 permitting such axial adjustment of the fuel supply tube while retaining a seal to prevent escape of gas from the burner. Means for centering the supply tube in the mixing zone include three adjustment bolts 38 which extend through nuts 40 mounted on the burner housing 12, and through openings in the housing, to engage the outside surface of the supply tube 28. One bolt 38 is provided for vertical adjustment of the supply tube 28 and two additional bolts disposed on opposite sides of the tube 28 permit horizontal adjustment.

Means are provided for admixing the air and fuel in the mixing zone 14 prior to their admission into the combustion zone 16. These mixers comprise a central bluff body 42 centered about the longitudinal axis of the mixing zone 14 and extending radially outwardly and a peripherial bluff body 44 spaced axially from the central bluff body and disposed about the periphery of the mixing zone 14, extending radially inwardly from the periphery toward the central longitudinal axis.

By the term "bluff body" as used herein is meant a non-streamlined, flow-interrupting body which is preferably, although not necessarily, of square-edged generally circular configuration and which causes mixing turbulence in the gases flowing in the burner.

As shown in greater detail in FIGS. 2 and 3, the central bluff body 42 preferably comprises a square cornered annular plate 46 mounted on the fuel supply tube 28 upstream from the orifices 32. The plate has an inside diameter approximately equal to the outside diameter of the gas supply tube 28 and an outside diameter substantially less than the diameter of the mixing zone 14, whereby oxidant gas may flow freely through the annular space defined by the inside diameter of the burner body 12 and the outside diameter of the plate 46.

Means are provided for mounting the plate 46 on the fuel supply tube 28 and for permitting its longitudinal adjustment with respect to orifices 32. Such mounting and adjustment means preferably comprise a plurality of nuts 48 welded edgewise to the plate 42 for receiving bolts 50 which may be selectively tightened to rigidly mount the plate 46 on the supply tube 28 and loosened to permit plate 46 to be adjusted longitudinally of the supply tube 28, with respect to the fuel orifices 32.

The peripheral bluff body 44 comprises a square-edged annular plate 52 having an outside diameter approximately equal to the diameter of the mixing zone 14 and a central opening 54 which permits the mixture of fuel and air to flow therethrough into the combustion zone 16. The plate 52 may be made of metal or other suitable material capable of withstanding high temperatures.

In operation of the burner, oxidant gas, preferably air, is supplied through duct 24, as indicated by arrows 56 and flows axially through the mixing zone 14 of the burner. Gaseous fuel, preferably natural gas, is supplied through tube 28 and exits from the orifices 32 in a generally radial direction, as indicated by the arrow 58. A mixing turbulence between the air and fuel is created, as indicated at 60, as the air flows around the central bluff body 42. An additional mixing turbulence, as indicated at 62, is caused as the air and fuel flow around the peripheral bluff body 44. Combustion takes place downstream of the peripheral bluff body 42 in the combustion zone 16 and remains stable, without the necessity for a flame holder.

As will be understood by those skilled in the art, various adjustments in the size, shape and relative positions of the central and peripheral bluff bodies, and of the position of the fuel orifices 32 with respect to the bluff bodies, may be necessary in order to provide stable, complete combustion under the various conditions of air to fuel ratios, BTU content of the fuel, oxygen content of the oxidant gas, air and fuel supply rates, pressures, temperatures, etc. Depending upon any particular combination of variables present, some degree of experimentation may be required in order to produce optimum results, and it is for this reason that the bluff body 42 is preferably made adjustable with respect to the gas orifices 32, and the assembly comprising the gas tube 28 with its holes 32 and the attached bluff body 42 is axially adjustable with respect to the peripheral bluff body 44.

While the central bluff body 42 is always maintained upstream from the gas supply orifices 32, the gas supply orifices and/or the central bluff body 42 may be positioned either upstream of the peripheral bluff body 44 (as indicated in FIG. 1) or downstream thereof (as indicated schematically in FIG. 4) in order to maintain optimum combustion. Also, it may be desirable to use a plurality of central bluff bodies 42 and peripheral bluff bodies 44 as illustrated in FIG. 5. In this event, it is desirable to provide a separate set of gas supply orifices for each of the central bluff bodies.

It has been found that positioning the gas supply orifices 32 and central bluff body 42 upstream of the peripheral bluff body 42 is preferable where the supply air is preheated to about 350° F. or higher. However, where ambient temperature supply air is utilized, more stable combustion is generally achieved by positioning the central bluff body and gas supply orifices downstream of the peripheral bluff body, as illustrated in FIG. 4.

Combustion takes place downstream of the peripheral body 44 which does not function as a flame holder; however, since it is subjected to radiant heat, it is preferably made of heat resistant material, as for example, heat resistant alloy. As hereinafter explained, a design may be used in which the peripheral bluff body is cooled by a small flow of combustion air.

In the preferred commercial embodiment of the burner, illustrated in FIG. 6 of the peripheral bluff body is formed of metal plate and cooling means are provided.

As shown in greater detail in FIG. 6 through 8, the peripheral bluff body 44 of the preferred commercial embodiment comprises an annular plate 64, preferably of metal, of slightly less outside diameter than the diameter of the mixing zone 14 and having a sufficient central opening 66 to permit the mixture of oxidant gas and fuel to flow the rethrough into the combustion zone 16. The annular plate 64 is centered in the mixing zone by means of a cylindrical support member 68 mounted on an annular flange 70 which fits between flanges 72 provided in the burner body 12. Bolts 74 extend through aligned openings in the flanges 70 and 72.

Mounting flange 70 has an inside diameter approximately equal to that of the supporting cylinder 68 for annular plate 64, thereby providing a central opening 76 through the flange 70 equal in diameter to the inside diameter of cylinder 68, through which opening 76 the air-fuel mixture may flow toward the annular plate 64, and through which the fuel supply tube 28 may extend into the cylinder 68, as illustrated in FIG. 6. A plurality of openings 78 are provided about the periphery of mounting flange 70 whereby supply air may circulate through the annular space 80 between the inside diameter of the burner body 12 and the outer surface of the support cylinder 68, thereby cooling the surface of the cylinder 68, which acts as a heat sink for the annular plate 64. If desired, a plurality of openings 82 may also be provided in the body of the supporting cylinder 68 to provide for additional gas circulation into the annular space 80.

A burner constructed substantially in accordance with FIG. 6, but lacking the central bluff body 42, has been commercially used for some period of time in connection with carbon black manufacture. However, this burner was generally unsatisfactory in that the distribution of temperatures in the combustion zone 16, from highest temperature to lowest in the zone, was too wide, indicating incomplete mixing of the supply air and fuel gas prior to combustion and also indicating incomplete combustion of the fuel. Also, under certain flow conditions, the burner was subject to severe and potentially destructive sonic vibrations. However, upon modification of the burner by addition of the central bluff body 42, combustion temperatures in zone 16 became more uniform, fuel combustion more complete and the destructive sonic vibrations were eliminated.

While the burner of the present invention may find utility in a variety of commercial and industrial applications, it is particularly useful as the burner section of a furnace-type carbon black reactor for the reasons stated in the Background of the Invention section above.

Referring now to FIG. 9, there is shown a burner 10 according to the present invention in combination with a carbon black reactor 84 including an outer housing 86, preferably of metal, lined with a refractory material 88 of varying thickness to provide a central longitudinal tunnel 90 of generally circular cross-sectional configuration and varying diameter. The reactor tunnel 90 includes a combustion zone 92 in which the admixed air and fuel gas from the burner 10 are combusted to produce high temperature combustion products which flow axially through the combustion zone to a reaction zone 94 comprising a convergent section 94a and divergent section 94b. A plurality of ports 96 extend through the housing 86 and refractory 88 of the reactor to provide access for feedstock supply tubes 98 through which hydrocarbon feedstock, preferably oil, is injected radially from nozzles 100 into the hot flowing combustion product gases in the convergent section 94a of the reactor. Although two feedstock injection tubes 98 are illustrated, any desired number may be utilized, disposed radially about the reactor. The feedstock injection tubes are adjustable radially with respect to the longitudinal axis of the reactor 84 so that the degree of radial penetration of the injection nozzles 100 into the reactor zone of the reactor may be controlled as desired. Also, a plurality of feedstock supply ports 96 are provided, spaced axially along the reactor, so that the feedstock supply may be selectively positioned as desired along the axis of the reactor. Feedstock injection ports not in use are closed by plugs 102.

The pyrolysis reaction commenced as the atomized feedstock oil is injected into the axially flowing hot gases from the burner 10 by nozzles 100 continue as the combustion gases and oil droplets move through the convergent and divergent portions of the reaction zone 94 and into the quench zone 104 in which the reactions are quenched by quench water 106 supplied through nozzle 108 from pipe 110. The resulting mixture of gases and carbon black product then exits the reactor to a suitable collection system (not shown) downstream, in which the product is separated from the combustion product gases and steam and is subsequently pelletized and packaged.

The foregoing disclosure and description of the invention and of the preferred embodiments is illustrative and explanatory thereof only and various changes may be made in the size, shape and meterials of construction without departing from the spirit of the invention.

What is claimed is:

1. A method for producing carbon black in a reactor having a longitudinally extending, generally cylindrical mixing zone, a combustion zone downstream thereof, a reaction zone downstream from said combustion zone, and a quench zone downstream from said reaction zone, said method comprising:

introducing an oxidant gas into said mixing zone and flowing said oxidant gas axially therethrough, flowing said oxidant gas around a centrally disposed bluff body in said mixing zone to generate turbulence in said oxidant gas stream downstream of said central bluff body, introducing gaseous fuel into said oxidant gas stream in the area of turbulence generated downstream of said central bluff body to partially admix said fuel and oxidant gas, flowing said partially admixed fuel and oxidant gas further downstream through said mixing zone and around a peripheral bluff body disposed about the periphery of said mixing zone and spaced axially from said central bluff body, whereby a second area of turbulence is generated downstream of said peripheral bluff body in which second area of turbulence admixture of said fuel and oxidant gas is completed, flowing said admixed fuel and oxidant gas into said combustion zone, for combustion therein, flowing the hot combustion product gases from said combustion zone into said reaction zone, introducing liquid hydrocarbon feedstock into said hot combustion product gases in said reaction zone, flowing said combustion product gases and feedstock through said reaction zone while said feedstock is reacted to produce carbon black and then into said quench zone, and introducing quench water into said quench zone to quench the reaction.

* * * * *